O. W. SMITH.
TROLLEY HARP.
APPLICATION FILED JUNE 23, 1910.
1,021,077.
Patented Mar. 26, 1912.
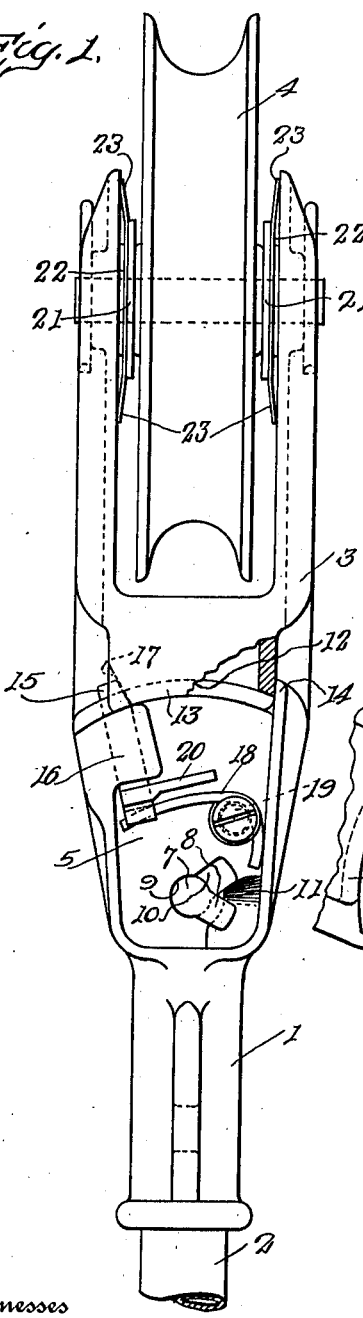
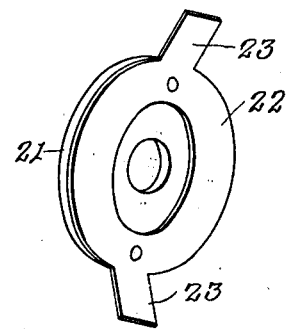
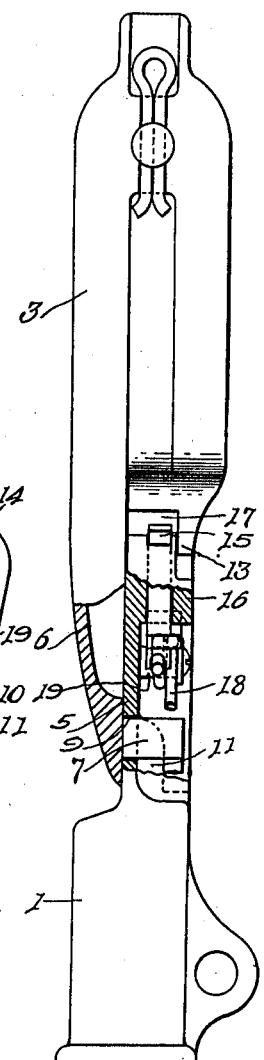
Inventor
Oscar W. Smith,

UNITED STATES PATENT OFFICE.

OSCAR W. SMITH, OF SPRINGFIELD, OHIO.

TROLLEY-HARP.

1,021,077. Specification of Letters Patent. Patented Mar. 26, 1912.

Application filed June 23, 1910. Serial No. 568,521.

*To all whom it may concern:*

Be it known that I, OSCAR W. SMITH, a citizen of the United States, residing at Springfield, in the county of Clark and State of Ohio, have invented certain new and useful Improvements in Trolley-Harps, of which the following is a specification, reference being had therein to the accompanying drawings.

This invention relates to trolley harps, and the object of the same is to provide a harp of such a construction that that portion thereof carrying the trolley wheel can be readily detached from the trolley pole, thereby enabling a worn trolley wheel to be quickly and easily removed and a new wheel substituted therefor.

To this end it is a further object of the invention to provide a trolley harp formed in two parts, one of which carries the trolley wheel and the other of which is permanently secured to the trolley pole, these parts having coöperating connecting devices adapted to be engaged one with the other when that portion of the harp carrying the trolley wheel has been displaced relatively to the base and to be held against disengagement when said parts are in their normal positions; and further to provide such a harp which will be very simple in its construction and may be manufactured at a small expense and may be so constructed as to have the same strength and durability as a one piece harp.

It is also an object of the invention to provide in connection with such a harp an improved contact spring and washer which will be simple in its construction, cheaply manufactured and highly efficient.

In the accompanying drawings, Figure 1 is a front elevation of a trolley harp embodying my invention; Fig. 2 is a side elevation of the same; Fig. 3 is a front elevation showing the fork turned at an angle to the body portion of the harp and partially broken away, and Fig. 4 is a detail view of the spring contact and washer.

In these drawings I have illustrated one embodiment of my invention and have shown the fork as formed in two parts, a base 1 which is adapted to be permanently secured to a trolley pole 2 and a fork 3 having the trolley wheel 4 rotatably mounted therein. The two parts of the harp are provided with coöperating connecting devices of such a construction that they may be engaged one with the other when the two parts of the harp have been laterally displaced and will be held against disengagement when the two parts of the harp are in their normal positions. In the present construction the two parts of the harp are provided with overlapping portions which are adapted to be connected one to the other. These overlapping portions are indicated at 5 and 6, respectively, and have their adjacent faces flat *i. e.*, their bearing surfaces are flat, it being obvious that the overlapping portions may be hollowed out or otherwise constructed to reduce their weight or for any other purpose. The overlapping portion 6 of the fork 3 constitutes a downward extension to that fork and is of a thickness considerably less than the thickness of the fork proper. Near its lower end this extension 6 is provided with a stud 7 extending outwardly from its face and having near its outer end a lip 8. The overlapping portion 5 of the base 1 is also in the form of an extension and is of a thickness less than the thickness of the base proper, and when placed in position upon the extension 6 of the fork the combined thicknesses of the two parts will be substantially equal to the thickness of the main portions of the harp. The extension 5 of the base has formed therein an aperture 9 having a lateral extension 10. The aperture 9 and its extension 10 are of such a size as to permit the passage of the stud 7 and its lip 8 when the two parts of the harp have been placed in such relative positions as to bring the lip in alinement with the extension 10 of the aperture 9. The arrangement, however, of the lip and the extension are such that they are in alinement only when the two parts of the harp have been laterally displaced relatively one to the other, as by turning one of these parts about the axis of the stud 7. When the parts are in their normal positions the lip 8 will extend beyond the edge of the aperture 9 and will prevent the separation of the two parts.

In order that the parts may be held snugly in engagement one with the other the extension 5 of the base is preferably provided with an inclined guide 11 arranged near the extension 10 of the opening therein and in such a position as to engage the under side of the lip 8 when the two parts of the harp are moved into their normal positions and thus draw the two parts of the harp one toward the other. The body portion of the fork 3 is provided with a guideway 12 arranged to receive the upper edge of the extension 5 and having a depending portion 13 to engage the outer face of that extension and hold the same snugly in position against the extension 6 of the fork. The extension 5 of the base has an upwardly extending finger 14 to engage the adjacent side of the fork and limit the movement of the fork in one direction about the axis of the stud 7. This finger is so arranged that when it is in engagement with the fork the fork and the base will be in alinement, which is their normal position. A suitable fastening device is arranged to retain the fork in engagement with the finger 14 and prevent the lateral displacement of the parts except when it is desired to detach the fork from the base. In the form here shown this fastening device comprises a pin 15 slidably mounted in an apertured lug 16 carried by the base 5 and adapted to engage that side of the fork opposite the side engaged by the finger 14. That portion of the fork engaged by the pin 15 is preferably inclined, as indicated at 17, and the pin 15 has its contact face beveled to correspond with the inclination of the fork. Thus the upward movement of the pin 15 will force the fork tightly against the finger 14 and will hold the two parts firmly against lateral displacement and against rattling or loose movement. A spring 18, mounted on a pin 19 carried by the extension 5 of the base, bears against the lower end of the pin and tends to press the same normally upward or toward the fork, thus exerting a continuous pressure on the fork toward the finger 14. The pin 15 has a finger piece 20 by means of which it may be withdrawn against the pressure of the spring 18 to permit the fork to be moved transversely to the base to bring the lip 8 of the stud 7 into alinement with the extension 10 of the opening 9 and allow the two parts of the harp to be separated.

The operation of the device is very simple and will be readily understood from the foregoing description.

It will be apparent that the construction of the harp is exceedingly simple, that it employs a minimum number of parts and that the construction and arrangement of these parts are such as to produce a harp having all the strength and durability of a one piece harp; and further, that the construction is such that the harp can be manufactured at a low cost. It will also be apparent that the two parts of the harp may be disengaged and reëngaged one with the other with a very slight effort and in a very small space of time. With a trolley harp of this construction it is possible for a car to carry one or more extra trolley wheels and in case of an accident to the wheel or to the harp, it is the work of but a few minutes to remove the injured fork or wheel and substitute a new one therefor, the operation requiring no tools and the construction of the harp being such that when the parts are assembled the wheel is necessarily in alinement with the base of the harp.

In connection with this harp I have also provided an improved contact spring and washer in which the washer 21 is rigidly secured to a ring 22, of brass or other suitable spring metal, and has at its opposite sides extensions or lips 23 bent outwardly away from the washer and adapted to engage the adjacent portions of the arms of the fork 3 and force the washer toward the trolley wheel, thus holding the washer firmly in engagement with the trolley wheel and at the same time providing an efficient contact by means of which the current is transmitted from the wheel to the fork.

While I have herein shown and described one embodiment of my invention it will be noted that this is shown for the purpose of illustration only and I wish it to be understood that I do not desire to be limited to the details of construction shown and described, for obvious modifications will occur to a person skilled in the art.

Having thus fully described my invention, what I claim as new and desire to secure by Letters Patent, is:—

1. A trolley harp comprising a base attached to a pole, and a detachable fork, said members having interlocking parts connecting the same one to the other and adapted to be moved into and out of alinement, said fork being movable transversely to the length of said pole to move said parts out of alinement and permit said fork to be detached from said base, and means for rigidly holding said fork normally against movement relatively to said base.

2. A trolley harp comprising a base attached to a pole, and a detachable fork, said members having interlocking parts connecting the same one to the other and adapted to be moved into and out of alinement, said fork being movable about an axis extending at an angle to the axis of the pole to move said parts out of alinement and permit said fork to be detached from said base, and positive means for holding said fork normally against movement about its axis.

3. A trolley harp comprising a base attached to the pole, and a detachable fork, one of said members being provided with a stud having a lateral projection and the other of said members having an opening to receive said stud and provided with an extension normally out of alinement with said projection, said fork being movable transversely to the length of said pole to bring said extension and the projection on said stud into alinement and permit said fork to be detached from said base, and a fastening device to rigidly hold said fork normally against movement relatively to said base.

4. A trolley harp comprising a base and a detachable fork, said parts having overlapping portions, one of said overlapping portions having an aperture with a lateral extension and the other of said overlapping portions having a stud with a laterally extending lip, the lateral extension of said opening and the lip of said stud being arranged at different angles to the length of said harp, whereby they can only be brought into alinement by the movement of one of said parts about the axis of said stud, and means to rigidly secure said parts in their normal positions.

5. A trolley harp comprising a base, and a detachable fork, said parts having overlapping portions, the overlapping portion of said fork having a stud extending outwardly therefrom and provided with a laterally extending lip, the overlapping portion of said base having an opening therein with a lateral extension, the lateral extension of said opening and the lip of said stud being arranged at different angles to the length of said harp, a stop carried by the overlapping portion of said base and adapted to engage one side of said fork, and a spring-pressed pin slidably mounted on the overlapping portion of said base and adapted to engage the other side of said fork to hold the same normally against movement relatively to said base.

6. A trolley harp comprising a base, and a detachable fork, one of said parts having an opening therein with a lateral extension and the other of said portions having a stud with a laterally extending lip, said lip and the lateral extension of said opening being arranged at different angles to the length of said harp, an inclined guide arranged on that portion of said harp having the opening therein and adapted to engage the under side of said lip to draw the two parts of said harp together, and means for rigidly retaining the two parts of said harp in their normal positions.

In testimony whereof, I affix my signature in presence of two witnesses.

OSCAR W. SMITH.

Witnesses:
ELZA F. McKEE,
EDWARD L. REED.

---

Copies of this patent may be obtained for five cents each, by addressing the "Commissioner of Patents, Washington, D. C."